（12) United States Patent
Chang et al.

(10) Patent No.: US 8,944,612 B2
(45) Date of Patent: *Feb. 3, 2015

(54) MULTI-PROJECTOR SYSTEM AND METHOD

(75) Inventors: Nelson Liang An Chang, San Jose, CA (US); Niranjan Damera-Venkata, Mountain View, CA (US); Arun Kumar Paruchuri, Princeton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 616 days.

This patent is subject to a terminal disclaimer.

(21) Appl. No.: 13/148,345

(22) PCT Filed: Feb. 11, 2009

(86) PCT No.: PCT/US2009/033835
§ 371 (c)(1),
(2), (4) Date: Aug. 8, 2011

(87) PCT Pub. No.: WO2010/093361
PCT Pub. Date: Aug. 19, 2010

(65) Prior Publication Data
US 2011/0309999 A1 Dec. 22, 2011

(51) Int. Cl.
*G03B 21/26* (2006.01)
*G03B 21/14* (2006.01)
*G03B 21/13* (2006.01)
(Continued)

(52) U.S. Cl.
CPC ............... *G03B 21/14* (2013.01); *G03B 21/13* (2013.01); *G03B 21/26* (2013.01); *H04N 9/3182* (2013.01); *H04N 9/3194* (2013.01); *H04N 13/0425* (2013.01); *H04N 13/0459* (2013.01); *H04N 9/3147* (2013.01)
USPC ........ 353/94; 353/7; 353/30; 353/69; 353/70; 353/122; 349/5; 349/7

(58) Field of Classification Search
USPC ........... 353/7–8, 30, 31, 69, 70, 94, 119, 122; 348/743–747, E5.142, E9.027, 36, 38, 348/189, 383; 349/5, 7–9
See application file for complete search history.

(56) References Cited

U.S. PATENT DOCUMENTS 7,237,911 B2 * 7/2007 Yamada ..................... 353/121
7,306,341 B2 12/2007 Chang
(Continued)

FOREIGN PATENT DOCUMENTS

JP 1995-333760 12/1995
JP 10260478 9/1998
(Continued)

OTHER PUBLICATIONS

International Search Report, PCT US2009033835/ Oct. 30, 2009, pages Feb. 11, 2009.

*Primary Examiner* — Sultan Chowdhury
(74) *Attorney, Agent, or Firm* — David R. McKinney, P.C.; David McKinney

(57) ABSTRACT

A method for automatic delivery of consistent imagery in a multi-projector system includes the steps of dividing the projectors into a plurality of sub-groups of projectors, each projector oriented to project a sub-frame to a sub-group display location, and adjusting the output of each projector in each sub-group to provide selected target display characteristics across all sub-groups.

15 Claims, 7 Drawing Sheets

(51) Int. Cl.
*H04N 9/31* (2006.01)
*H04N 13/04* (2006.01)

(56) References Cited

U.S. PATENT DOCUMENTS

| | | |
|---|---|---|
| 7,407,295 B2 | 8/2008 | Damera-Venkata et al. |
| 7,443,364 B2 | 10/2008 | Damera-Venkata et al. |
| 2003/0147015 A1* | 8/2003 | Katoh et al. .............. 349/5 |
| 2003/0156262 A1 | 8/2003 | Baker et al. |
| 2004/0145709 A1 | 7/2004 | Colucci et al. |
| 2004/0239884 A1 | 12/2004 | Nagashima et al. |
| 2005/0117121 A1 | 6/2005 | Meerleer |
| 2007/0052934 A1* | 3/2007 | Widdowson et al. ........... 353/94 |
| 2007/0091277 A1 | 4/2007 | Damera-Venkata et al. |
| 2007/0097017 A1 | 5/2007 | Widdowson et al. |
| 2007/0097334 A1 | 5/2007 | Damera-Venkata et al. |
| 2007/0132965 A1* | 6/2007 | Damera-Venkata et al. ... 353/94 |
| 2007/0133794 A1 | 6/2007 | Cloutier et al. |
| 2007/0229778 A1 | 10/2007 | Cha et al. |
| 2008/0002160 A1 | 1/2008 | Chang et al. |
| 2008/0024469 A1 | 1/2008 | Damera-Venkata et al. |
| 2008/0024683 A1 | 1/2008 | Damera-Venkata et al. |
| 2008/0270512 A1 | 10/2008 | Guo et al. |
| 2009/0009658 A1* | 1/2009 | Aufranc et al. ............... 348/383 |
| 2009/0225234 A1* | 9/2009 | Ward et al. .................... 348/744 |

FOREIGN PATENT DOCUMENTS

| | | |
|---|---|---|
| JP | 2000199849 | 7/2000 |
| JP | 2002-116500 | 4/2002 |
| JP | 2004-080161 | 3/2004 |
| JP | 2004191878 | 7/2004 |
| JP | 2005-084275 | 3/2005 |
| JP | 200653205 | 2/2006 |
| JP | 2006-145933 | 6/2006 |
| JP | 2006-516333 | 6/2006 |
| JP | 2007-171327 | 7/2007 |
| JP | 2008-539675 | 11/2008 |
| JP | 2009-008974 | 1/2009 |

* cited by examiner

MULTI-PROJECTOR SYSTEM AND METHOD

BACKGROUND

Multiple projector systems have been developed to project multiple video images to a common display location, such as a screen or wall, to produce a composite display. A composite display is one in which a single image is produced using multiple projectors, with each projector producing a portion or component of the total image. These display systems can be configured to allow multiple sub-frames to overlap completely, not at all, or anything in between, or to provide multiple separate composite images. Yet another application for a multiple projector system is the production of three-dimensional ("3D") stereoscopic images.

One challenge associated with composite images is consistent reproduction of color, brightness, etc., across multiple displays or multiple channels on the same display. For example, brightness and color intensity can vary within each individual portion of a composite display, with the result that the composite image has noticeable irregularities. It can also be difficult to calibrate and reconfigure multiple projector systems between various display configurations, such as to allow content to flow across multiple screens in a single display, while also providing consistent brightness, color, etc. Additionally, the production of 3D stereoscopic images using a multiple projector system has typically been complicated and difficult.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
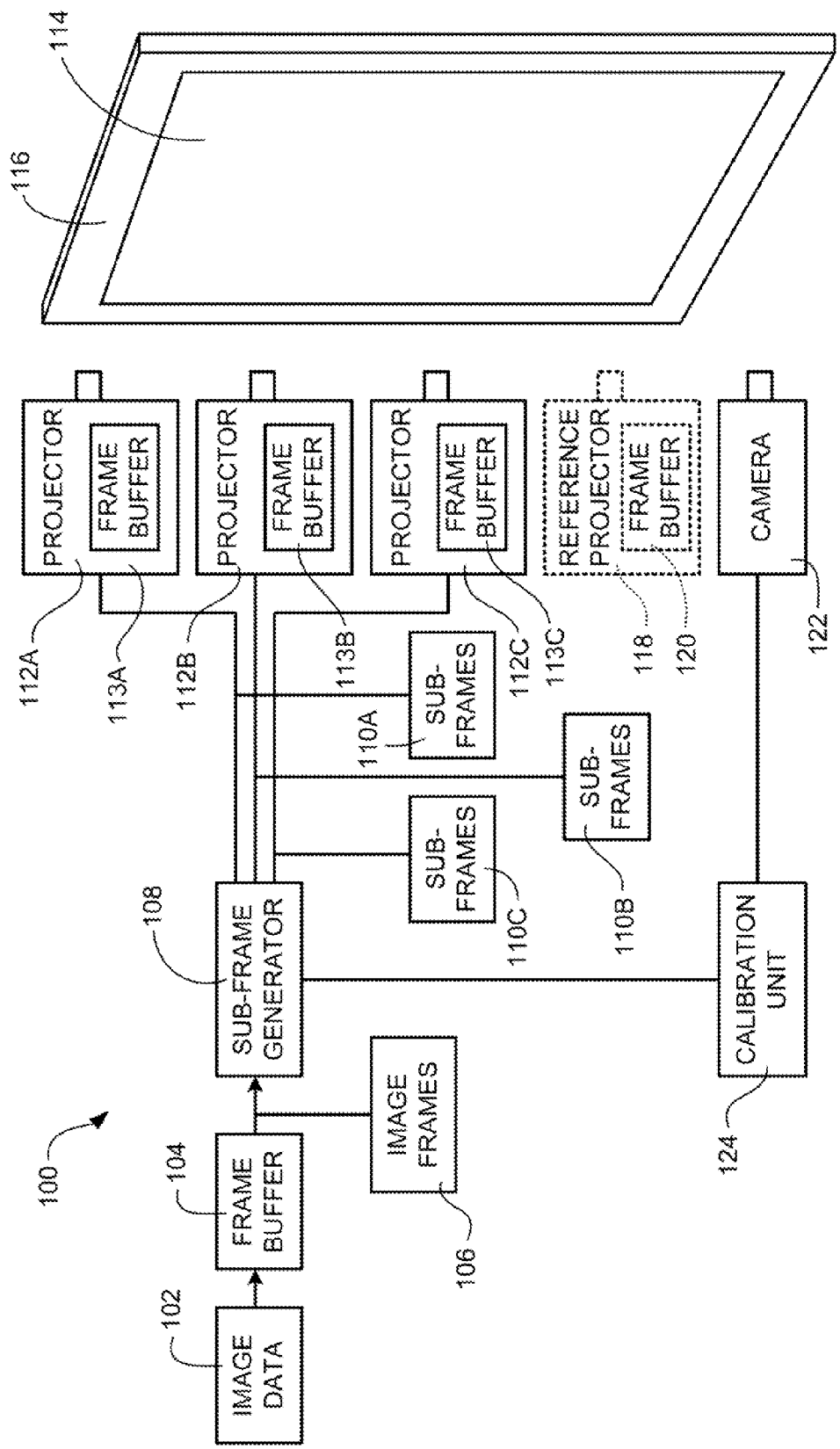
FIG. 1 is a block diagram of one embodiment of an image display system configured to produce a composite image using multiple projectors.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting.

As used herein, the term "sub-frame" refers to that portion of a display image that is produced by a single projector. A complete display image produced by multiple sub-frames from multiple projectors is referred to as a "composite image." It is to be understood that a composite image can be produced by a sub-group of projectors (i.e. fewer than all of the projectors) in a multiple projector system.

FIG. 1 is a block diagram illustrating an embodiment of a prior art multi-projector image display system 100. The image display system 100 processes image data 102 and generates a corresponding displayed image 114. The displayed image 114 is defined to include any pictorial, graphical, or textural characters, symbols, illustrations, or other representations of information.

In one embodiment, the image display system 100 includes an image frame buffer 104, a sub-frame generator 108, projectors 112A-112C (collectively referred to as projectors 112), camera 122, and a calibration unit 124. The image frame buffer 104 receives and buffers image data 102 to create image frames 106. The sub-frame generator 108 processes the image frames 106 to define corresponding image sub-frames 110A-110C (collectively referred to as sub-frames 110). In one embodiment, for each image frame 106, the sub-frame generator 108 generates one sub-frame 110A for projector 112A, one sub-frame 110B for projector 112B, and one sub-frame 110C for projector 112C. The sub-frames 110A-110C are received by the projectors 112A-112C, respectively, and stored in the image frame buffers 113A-113C (collectively referred to as image frame buffers 113), respectively. The projectors 112A-112C project the sub-frames 110A-110C, respectively, onto the target surface 116 to produce the displayed image 114 for viewing by a user.

The image frame buffer 104 includes memory for storing image data 102 for one or more image frames 106. Thus, the image frame buffer 104 constitutes a database of one or more image frames 106. The image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

The sub-frame generator 108 receives and processes image frames 106 to define a plurality of image sub-frames 110. The sub-frame generator 108 generates sub-frames 110 based on the image data in image frames 106. In one embodiment, the sub-frame generator 108 generates image sub-frames 110 having a resolution that matches the resolution of the projectors 112, which is less than the resolution of image frames 106 in one embodiment. The sub-frames 110 each include a plurality of columns and a plurality of rows of individual pixels representing a subset of an image frame 106.

The projectors 112 receive image sub-frames 110 from the sub-frame generator 108 and, in one embodiment, simultaneously project the image sub-frames 110 onto the target surface 116 at overlapping and/or spatially offset positions to produce the displayed image 114. In one embodiment, the display system 100 is configured to give the appearance to the human eye of high-resolution displayed images 114 by displaying overlapping lower-resolution sub-frames 110 from multiple projectors 112. These overlapping sub-frames can be spatially shifted or have arbitrary geometric transformations with respect to one another. In one embodiment, the projection of overlapping sub-frames 110 gives the appearance of enhanced resolution (i.e., higher resolution than the sub-frames 110 themselves). Approaches have been developed for determining appropriate values for the sub-frames 110 so that the resulting displayed image 114 produced by the projected sub-frames 110 is close in appearance to how the high-resolution image (e.g., image frame 106) from which the sub-frames 110 were derived would appear if displayed directly.

It will be understood by a person of ordinary skill in the art that the functions performed by the sub-frame generator 108 may be implemented in hardware, software, firmware, or any combination thereof. The implementation may be via a microprocessor, programmable logic device, or state machine. Components of the system may reside in software on one or more computer-readable media devices. The term computer-readable media as used herein is defined to include any kind of memory, volatile or non-volatile, such as floppy disks, hard disks, CD-ROMs, flash memory, read-only memory, and random access memory.

Also shown in FIG. 1 is reference projector 118 with an image frame buffer 120. The reference projector 118 is shown in hidden lines in FIG. 1 because, in one embodiment, the projector 118 is not an actual projector, but rather is a hypothetical high-resolution reference projector that is used in an image formation model for generating optimal sub-frames 110. In one embodiment, the location of one of the actual projectors 112 can be defined to be the location of the reference projector 118. The display system 100 can also include a camera 122 and a calibration unit 124, which can be used to automatically determine a geometric mapping between each projector 112 and the reference projector 118.

The image display system 100 can include hardware, software, firmware, or a combination of these. In one embodiment, one or more components of the image display system 100 (e.g. the frame buffer 104, sub-frame generator 108 and calibration unit 124) are included in a computer, computer server, or other microprocessor-based system capable of performing a sequence of logic operations. Such a system is generally referred to herein as a "controller" for the multi-projector system. In addition, processing can be distributed throughout the system with individual portions being implemented in separate system components, such as in a networked or multiple computing unit environment (e.g. clustered computers).

While the embodiment shown in FIG. 1 includes three projectors, and one camera, these quantities of components are only exemplary. For example, another embodiment of a multi-projector system 200 is shown in pictorial form in FIG. 2. This embodiment includes twelve projectors 202a-l, all oriented to produce a single composite image 204 on a display surface 206. As shown in this example, the twelve projectors produce twelve sub-frames, labeled 208a-l, which in this figure are combined together to provide a single wide format composite image 204. While the superimposed sub-frames 208 are shown spatially offset from each other in FIG. 2, this is for illustrative purposes, and does not necessarily correspond to the actual positioning of sub-frames to produce the composite image 204. It is also to be appreciated that the actual physical location or grouping of projectors in a multi-projector system can vary. For example, while the projectors 202 in FIG. 2 are physically arranged in three groups of four and the sub-frames on the display are generally in three groups of four, the projectors could be arranged in a different physical position, and any of the twelve projectors 202a-l can be configured to produce any one of the twelve sub-frames 208a-l.

The twelve projectors 202 are controlled by a controller system, which can be a computer, computer server, or other microprocessor-based system capable of driving the projectors to produce the composite image, as discussed above. The controller is designated generally at 210. However, as noted above, the controller system can include multiple computing devices, such as a first controller computer 210a and a second controller device 210b, that is networked or clustered with the first controller computer. Similarly, the system 200 in FIG. 2 includes a camera 214 for feedback and adjustment of the projectors 202, but can also include multiple additional cameras 216, 218, which also provide feedback to the calibration unit (124 in FIG. 1) that is associated with the controller 210 or clustered controller group.

Figure 2:
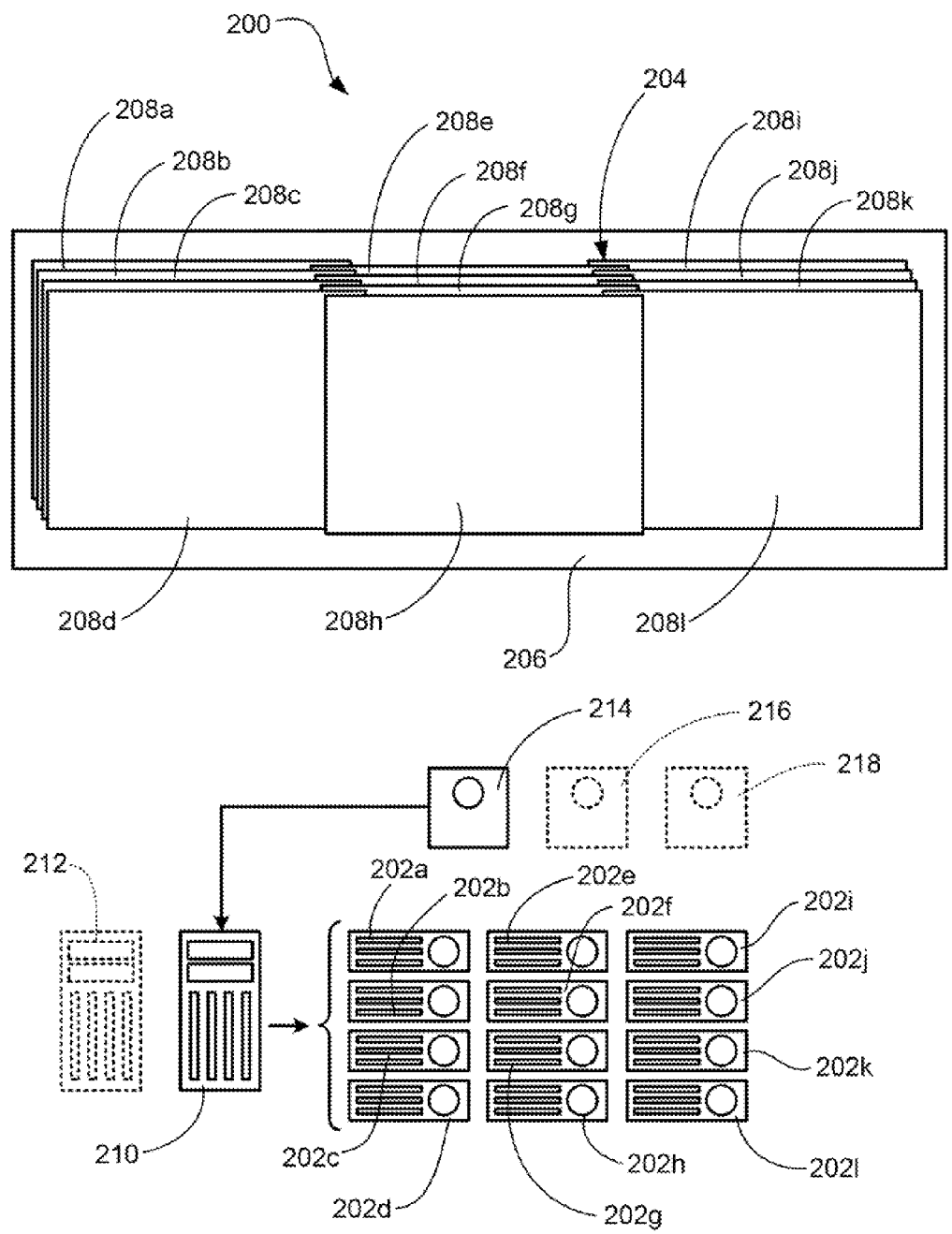
FIG. 2 is a diagram of an embodiment of a multi-projector system and a composite display produced thereby.
Figure 3:
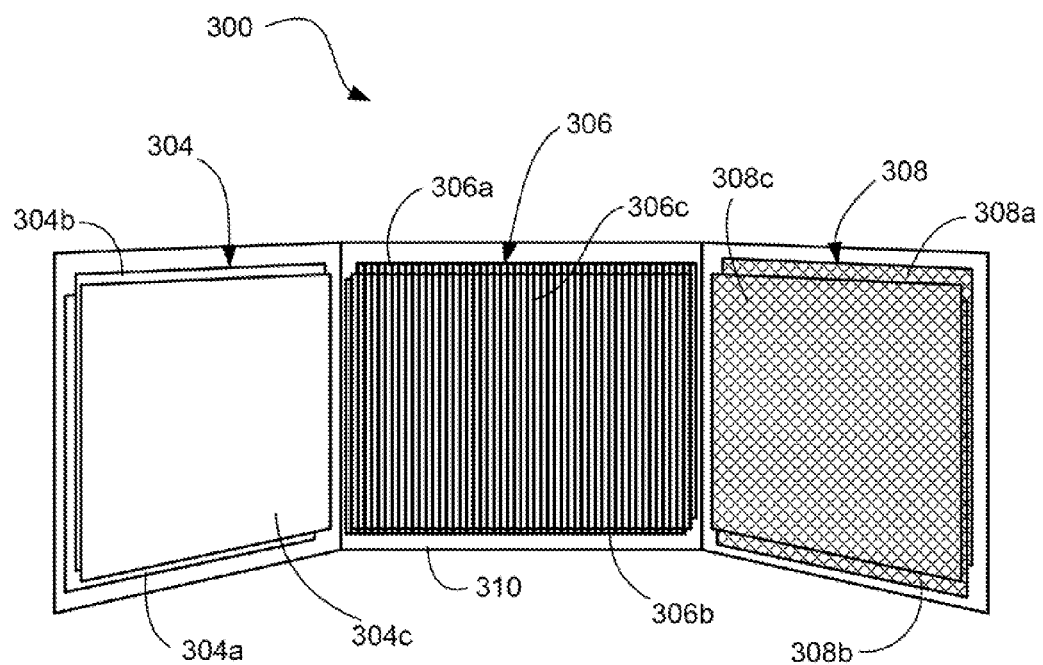
FIG. 3 is a diagram of an embodiment of a multi-projector system and display in which the projectors are divided into multiple sub-groups, to produce multiple composite images on a bent backdrop-type screen.
Figure 3:
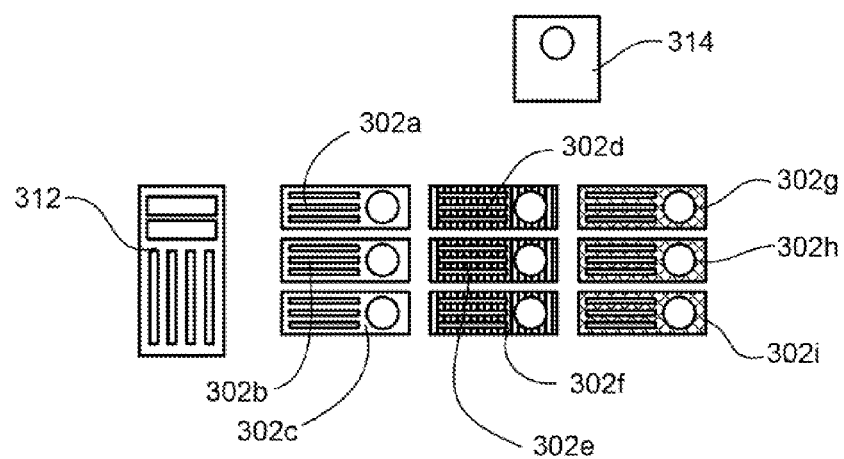

The multi-projector systems in FIGS. 1 and 2 are shown producing a single composite image using all available projectors. However, it has been found that it can be desirable to divide a group of projectors in a multi-projector system into sub-groups. Shown in FIG. 3 is an embodiment of a multi-projector system 300 in which the projectors 302 are divided into sub-groups, to produce multiple composite images 304, 306, 308 on a bent backdrop-type screen 310. While this screen is shown as including three connected portions, it could alternatively include multiple separate surfaces, each one addressed by a different sub-group. In this case, a first sub-group of three projectors 302a-c provide three sub-frames 304a-c that produce composite image 304, a second sub-group of three projectors 302d-f provide three sub-frames 306a-c that produce composite image 306, and a third sub-group of three projectors 302g-i provide three sub-frames 308a-c that produce composite image 308. While the embodiment shown in FIG. 3 includes three screens, any number of multiple screens can be used. These multiple composite images 304, 306, 308 can be produced using a single microprocessor controller system 312 (whether a single computer device, or multiple computers or devices that are networked or clustered together), and can be related images or independent images. The multiple composite images can represent multiple composite displays or multiple channels on the same composite display. At least one camera 314 can be oriented toward the display screen 310 to provide feedback to a calibration unit (not shown) associated with the controller 312, in the manner discussed above.

As noted above, one challenge associated with producing composite images is consistent reproduction of color, brightness, etc., across multiple composite displays or multiple channels on the same composite display. This is particularly an issue where these displays are produced using a single microprocessor system. It is generally desirable that a composite display (as in FIG. 2) or group of composite displays (as in FIG. 3) have the same visual characteristics throughout (e.g. consistent brightness, color). For example, it can be distracting for one image in a multi-screen display or one eye in a stereoscopic/3D display to differ in color or brightness. Likewise, it can be undesirable if a multi-screen signage display having content that flows across the screens exhibits differing brightness and/or color across the different screens.

Advantageously, the present disclosure provides various embodiments of a system and method that have been developed to allow automatic delivery of consistent imagery (e.g. consistent brightness, color, etc.) using a multi-projector composite display system across multiple screens and/or multiple channels. This system and method is also useful for stereoscopic 3D applications. There are different techniques for displaying stereoscopic 3D images. As is well known, stereoscopic 3D images involve left and right image pairs that are slightly different in perspective. When a viewer sees one image of the pair with the left eye and the other with the right eye (typically with the aid of special polarized or color filter glasses), the effect can approximate actual human stereoscopic vision of three dimensional objects.

Some 3D projectors use time multiplexing to alternately display two channels corresponding to left and right images. While these images can be consistent in color and brightness (because they are produced by the same projector), this is often obtained in a trade-off of bit depth and overall brightness. These types of projectors can also be very expensive. Alternatively, dual projectors can be used for stereoscopic 3D images. One projector will project the left image and the other will project the right image. Dual projector systems often require manual calibration and alignment, as well as balancing luminance and color so that the two channels are consistent. These tasks generally require the services of highly trained technicians, and can be time consuming. Also, these dual projector solutions typically have a fixed aspect ratio, fixed resolution, and fixed brightness.

Many prior 3D approaches can deliver at most two distinct views, and/or involve the use of 3D glasses. However, those of skill in the art will recognize that some systems can be multi-view (i.e. deliver more than two views), and that autostereoscopic (not requiring glasses) displays are also available. Autostereoscopic displays are commonly multi-view, and as a user moves his viewing position from side to side with respect to the display, the eyes receive a more appropriate pair of views to give a stereo/3D view. These displays are limited because they can only give a relatively small number of view zones (e.g. the object appears to "jump" in 3D as the viewer moves between view zones). Moreover, in order to obtain these results, displays with optical elements are often used. Each view is produced by spatially multiplexing the available display pixels (LCD or projected), thereby trading off the number of distinct views/view zones and spatial resolution. For multi-screen solutions, it is not entirely easy to reconfigure the system to other display configurations or to flow content across the screens.

Figure 4:
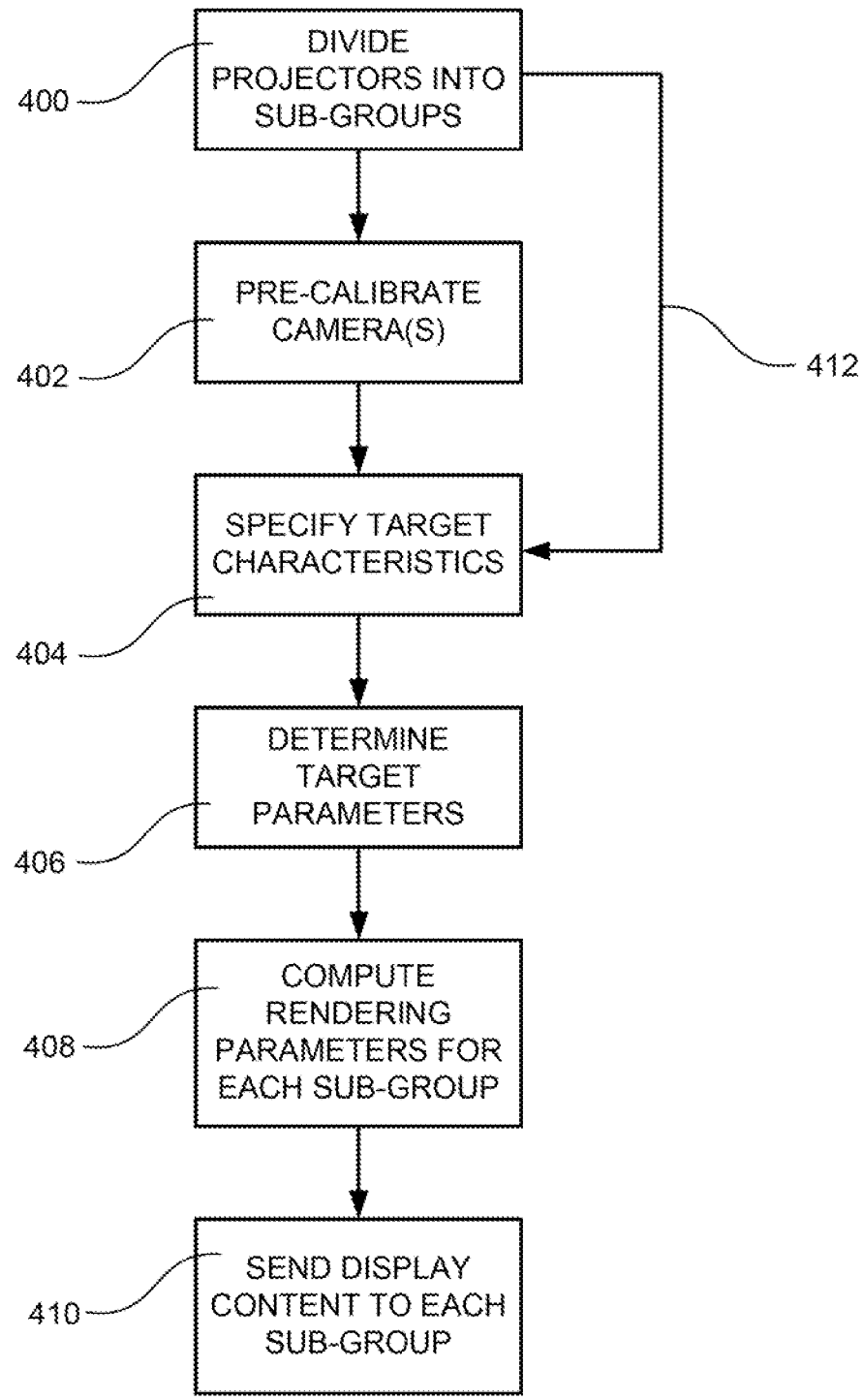
FIG. 4 is a flowchart outlining the steps in an embodiment of a method for producing a consistent composite image across multiple displays or multiple channels on the same display using a common microprocessor control system.

Shown in FIG. 4 is a flowchart outlining the steps in an embodiment of a method for producing consistent composite image characteristics across multiple displays or multiple channels on the same display using a common microprocessor control system. In this method, the display system is assumed to be a multi-projector display system like that shown and described in any of FIGS. 1-3, consisting of a collection of projectors, multiple graphic cards, one or more PCs clustered together, one or more calibration cameras, and one or more display surfaces. Through this invention, the system could be easily configured to display multiple screens simultaneously (displaying different content or even related content).

The first step 400 in the method is to divide the projectors into physical sub-groups. The multi-projector system disclosed herein includes at least two sub-groups of at least one projector each. However, different numbers of projectors per sub-group and different numbers of sub-groups can be used. For example, the system shown in FIG. 3 includes three sub-groups of three projectors. Another embodiment, shown in FIG. 7 and discussed below, includes four sub-groups of three projectors each. It is also to be appreciated that the sub-groups in a given multi-projector system can have different numbers of projectors in the sub-groups. For example, a system with eight projectors can be divided into two sub-groups with three projectors each, and a third sub-group with two projectors.

The projectors are grouped to cover the different screens or channels that are associated with the multi-projector system. Each projector is assigned to exactly one sub-group at any one time, though of course the system can be reconfigured when desired to reassign the projectors to different sub-groups. As noted above, the display system uses centralized resources (cameras, PCs, etc), and can be front- or rear-projected or both. Mixed projector technologies can also be used. For example, some projectors in the system can be LCD projectors, while others are DMD devices.

Once the projectors have been mapped to the different sub-groups, the next step 402 can be to pre-calibrate the calibration camera(s) to account for differences from the underlying mathematical model. In one embodiment, an amount of lens distortion for each calibration camera, as well as the relative orientation and position of each camera, is calculated using a known calibration pattern or chart. Once computed, the control system can precompensate each subsequently captured image to account for the lens distortion and relative geometry.

In another embodiment, the vignetting effect is estimated and eliminated for each calibration camera. As will be appreciated by those of skill in the art, light intensity detection can vary across the field of view of a given camera. In particular, there can be a reduction in light intensity detection at the margins of the image. It is desirable to compensate for this "vignetting" effect (also called a luminance profile or intensity profile) for each camera. This compensation is often performed by using a flat white physical target of known intensity characteristics. By viewing that pattern with each calibration camera and measuring the luminance intensity variation of the resulting image via the calibration unit, this allows the system to estimate the intensity vignetting based upon spatial variation of intensity detection across the calibration pattern image. Once the intensity variation is known, the control system can postcompensate each subsequently captured image, so that all images captured by that camera will not suffer from the vignetting effect. In this way, the camera(s) become pre-calibrated to give accurate comparative intensity readings.

As suggested by arrow 412 in FIG. 4, the process can move from step 400 to step 404, without pre-calibrating the cameras. Whether the camera(s) are pre-calibrated or not, the next step 404 is to specify the target characteristics between the sub-groups of projectors. Target characteristics for each sub-group are specified with respect to one or more of the other sub-groups. For example, it is desirable that the luminance profile and color gamut of sub-group #1 and sub-group #2 be similar, or at least consistent. As another example, it can be desirable for the sub-groups to conform to the same reference bounding box (e.g. for stereo 3D output). Thus this step involves identifying the parameters and the constraint function(s) relating the projector sub-groups.

In some cases, this step involves first using modeling and measurement steps for each sub-group. Examples of these modeling and measurement steps include calibrating the projection brightness of each sub-group to be as uniform as possible. In one embodiment, the image pipeline for the multi-projector system uses a sophisticated image formation model and automatic measurement steps via feedback through the calibration camera(s), including measuring the inter-projector geometry, luminance, color, black offset, etc. These modeling and measurement steps are outlined in N. Damera-Venkata, N. L. Chang, J. M. DiCarlo, "A Unified Paradigm for Scalable Multi-Projector Displays," IEEE Transactions on Visualization and computer Graphics, November-December 2007, and in U.S. Pat. Nos. 7,306,341, and 7,443,364, and United States Patent Application Publication Nos. 2007/0091277, 2007/0097334, 2008/0002160, 2008/0024469, 2008/0024683, and 2008/0143978, the disclosures of which are incorporated by reference herein.

As described in the above references, a series of patterns are projected by a set of projectors and subsequently captured by the camera(s) to estimate the calibration parameters with respect to the imaging model. In one embodiment, based on the linearity of light, the model is a summation of each projector's light output, after undergoing any geometric transformations, resampling, luminance variations, color gamut changes, as well as inherent light leakage (or black offset). Once estimated, the calibration parameters facilitate an accurate prediction of the projectors' final image. As described in the above references, desired target parameters (e.g. luminance profile for the entire projector system, color gamut, etc) are chosen for the set of projectors, and rendering parameters for each projector are optimized based on the desired target parameters. The rendering parameters encapsulate the information needed to make each sub-group appear as though the output came from a single projector (i.e. so that the output appears seamless and achieves certain desired image properties). For example, this approach helps ensure that the geometry, luminance, and color of the resulting image are consistent throughout the set of projectors. In the system and method disclosed herein, each sub-group of projectors undergoes this modeling and measurement process.

Once the target characteristics for the sub-groups have been specified, the next step 406 is to determine the target parameters (brightness, color, etc) for each sub-group to ensure consistent rendering across all sub-groups. In other words, projection values for brightness, color, etc. are assigned to the projectors in the different sub-groups so that the final projected images are consistent between sub-groups with respect to these parameters. In the example of multi-channel stereoscopic 3D, this step can include scaling down the brighter of the two target luminance surfaces corresponding to the "left" and "right" sub-groups. Normally with multiple projectors there can be brightness discontinuities and seams, etc. In order to make the output from multiple individual projectors appear as if it came from a single projector, one with a particular smoothly varying luminance surface/profile, the target luminance surface of one sub-group may be substantially brighter than one obtained for a second sub-group, so this would also need to be factored in during calibration.

As another example, the system can examine the chromaticity of the projectors in each sub-group and take the intersection gamut of the color space of all the projectors in each sub-group to ensure that all content can be feasible in color. After the above measuring and modeling steps are performed for each sub-group, the resulting calibration parameters are adjusted so that the color gamut of one sub-group does not vary significantly from a second one, thereby ensuring consistency across sub-groups. The calibration camera captures these images, and the calibration unit analyzes the chromaticity of the respective projector to determine the full range of color values that the projector can produce. When this is done for all projectors, the intersection gamut represents the full range of color values that all projectors can produce. Information regarding the intersection gamut of available colors can be used to allow the system to select color values that are within the available color space for any projection color values that may fall outside that space. This allows a color that cannot be accurately rendered by all projectors to be adjusted to the closest color within the common color space, so that all sub-groups project the same color for a given color value Following the determination of the target parameters for the different sub-groups, the next step 408 is to compute the rendering parameters for the entire system using the parameters for each sub-group. For the purposes of rendering, each sub-group is regarded as a separate "display". The multi-projector system computes the projection differences among the projectors in a given sub-group and then solves for the parameters needed to adjust each projector so that when combined, the final result looks seamless and exhibits the desired target characteristics. In one embodiment, a training algorithm is executed to efficiently compute these rendering parameters. This process is outlined in U.S. Patent Application Publication No. 2008/0024469.

In the last step 410 shown in FIG. 4, appropriate display content is sent to each projector in each sub-group at display time. When it is desired to display some content, the computed rendering parameters are applied to every desired frame to determine how to adjust each projector's image so that when projected in the sub-group configuration, the resulting image achieves the desired characteristics. Because of the foregoing calibration steps, the system can display distinct, related, or identical content via each sub-group, with consistent display characteristics in each sub-group. In this way, one can treat a multi-screen display as a connected display where the content can flow across the sub-groups. Likewise, in the stereoscopic/3D display case, the appropriate content will be displayed in sync to the correct viewers' eyes with consistent characteristics.

Figure 5:
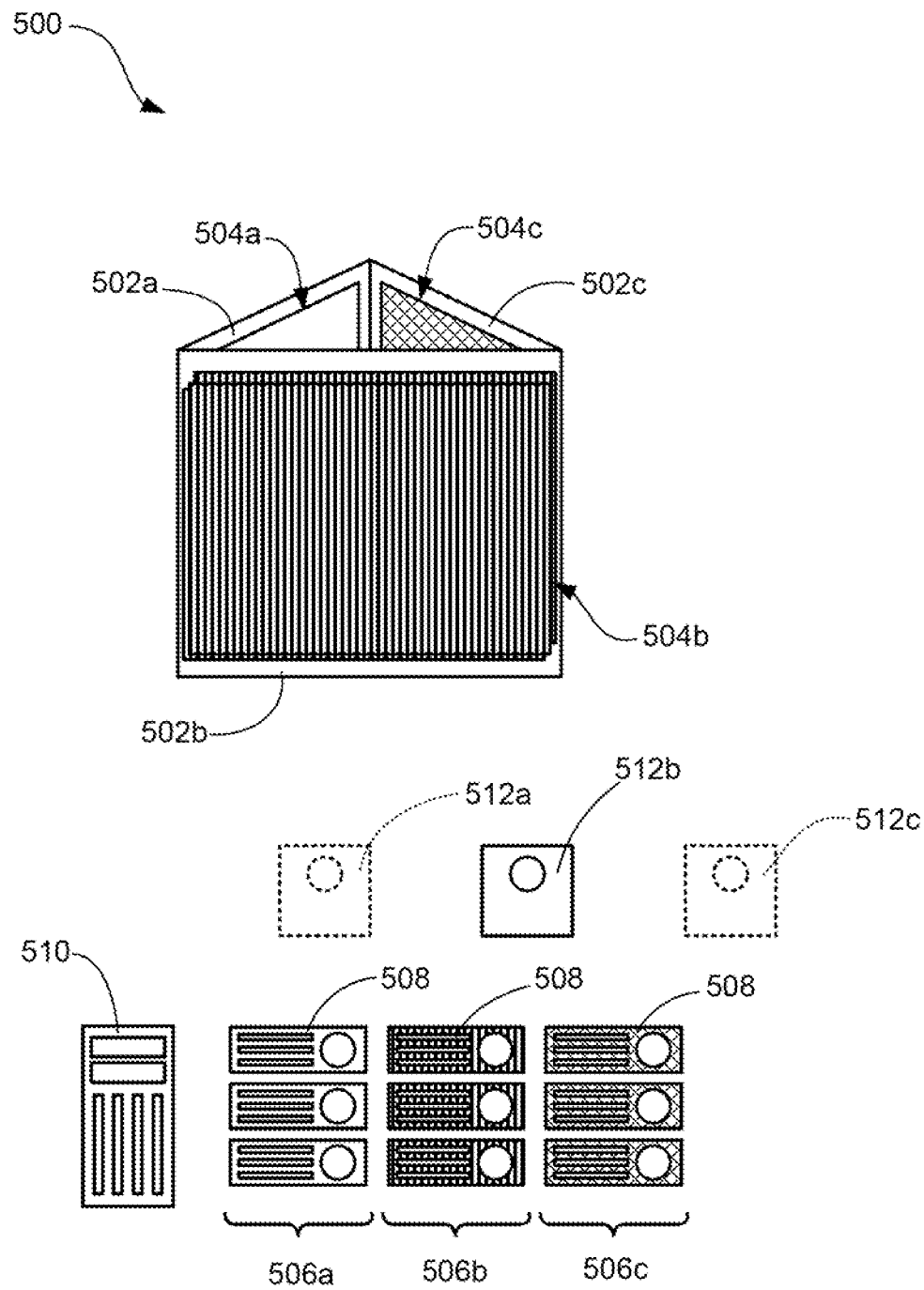
FIG. 5 is a diagram of an embodiment of a multi-projector system and display in which the projectors are divided into multiple sub-groups, to produce multiple composite images on a multi-sided kiosk-type screen.

In addition to the embodiments shown in FIGS. 2 and 3, another embodiment for this system and method is a multi-screen display for digital signage, such as shown in FIG. 5. In this embodiment, the display system 500 includes three screens 502*a-c* that are arranged in a triangular column. These screens can be front- or rear-projection screens. Each screen presents a composite display 504*a-c* that is provided by one of three subgroups 506, each sub-group including three projectors 508. Specifically, composite display 504*a* is provided by three projectors in sub-group 506*a*, display 504*b* is provided by the projectors in sub-group 506*b*, and display 504*c* is provided by the projectors in sub-group 506*c*.

The projectors 508 in the sub-groups 506 are controlled by a controller system 510, which includes a calibration unit (not shown) and receives feedback from one or more calibration cameras 512*a-c*. The resulting content on the three-screen sign 502 can be three distinct content streams or one smoothly moving stream that flows across all three screens, for example. While the embodiment shown in FIG. 5 includes three screens, any number of multiple screens can be used. Likewise, while the multi-projector system includes three sub-groups of three projectors each, other quantities of projectors can be used.

Figure 6:
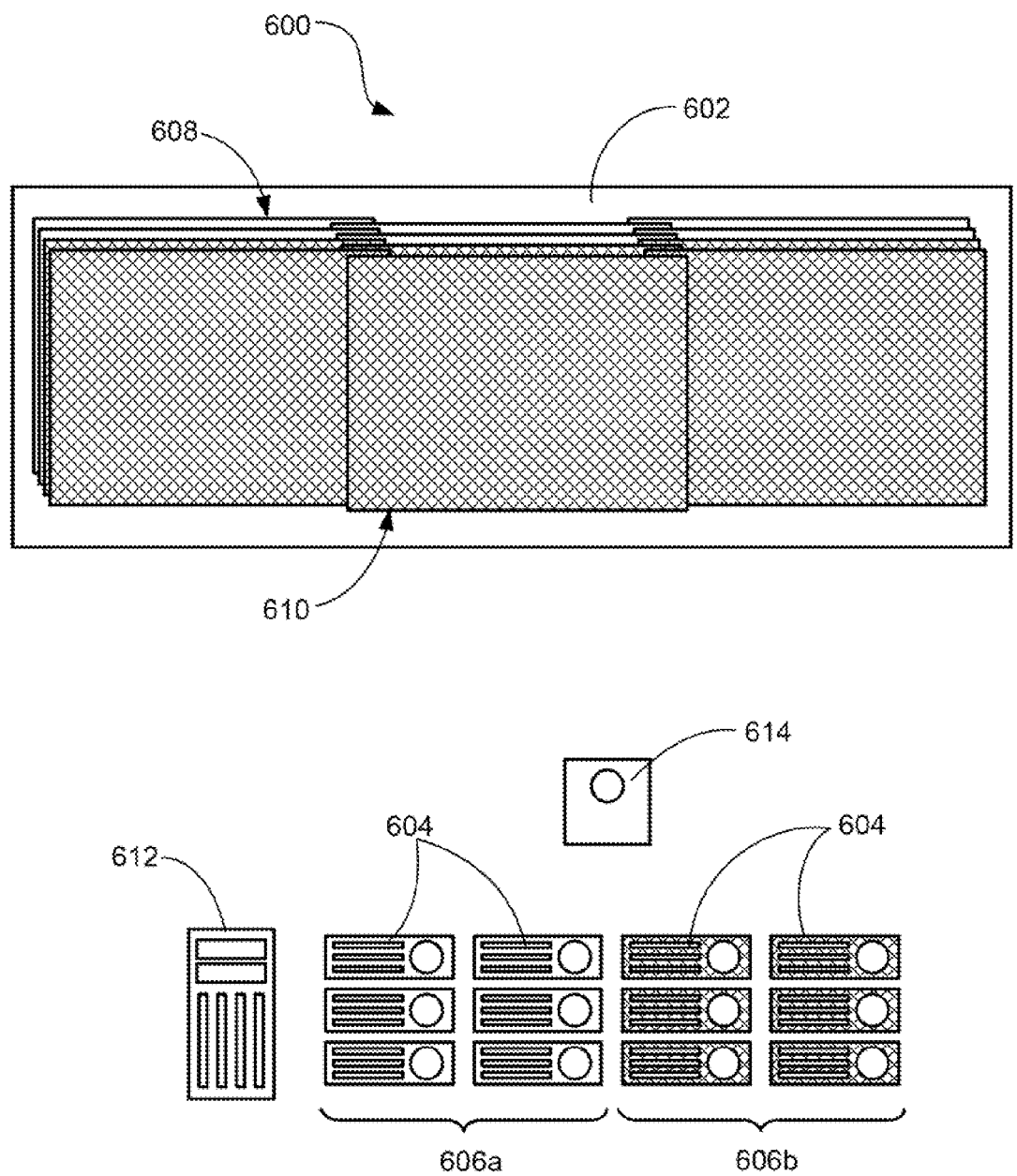
FIG. 6 is a diagram of an embodiment of a multi-projector system and display in which the projectors are divided into multiple sub-groups, to produce a single 3D stereoscopic composite image.

Another embodiment of a multi-projector system that can be configured as disclosed herein is shown in FIG. 6. This embodiment provides a stereoscopic/3D display 600 in which two visual channels are superimposed on the same physical display surface 602. Specifically, this system includes twelve projectors 604, divided into two sub-groups 606*a, b*. The first sub-group 606*a* corresponds to the "left" channel, projecting the content that should be sent to the viewers' left eye, while the second sub-group 606*b* corresponds to the channel for the "right" eye. Both channels are superimposed on each other on a common display 602, providing a left eye composite display 608, and a right eye composite display 610, each of these composite displays being produced by images from half the projectors 604 in the multi-projector system. The projectors are driven by a controller system 612, which receives feedback from at least one calibration camera 614, in the manner discussed above.

Using any of a variety of available 3D display technologies for each sub-group 606 (e.g. polarized glasses, etc), the resulting system provides a wide format stereoscopic display having high image quality, but using multiple relatively inexpensive projectors. As with multiple projector systems generally, because the display is produced by multiple projectors, it can be varied in many ways beyond merely providing a wide format display. For example, the aspect ratio, shape, size, brightness, resolution, and redundancy of the display can be adjusted to almost any desired configuration. This type of 3D system is believed to be useful for the entertainment industry, as well as oil and gas and automotive companies for visualization and design applications. For example, one type of functionality that may be desirable in these types of applications is the ability to provide 3D stereoscopic viewing capability with a multi-projector display system that has other uses as well.

This type of system can also be configured so that viewers see only one channel, depending on the glasses. For example, this type of system can be useful for large display computer gaming. When two players want to play next to each other but share a large display, the multi-view capability can enable one player to see one view and the other to see a different view, even though they are both looking at the same physical screen. For example, instead of having glasses with complementary polarization (e.g. clockwise and counterclockwise circularly polarization), one player can have strictly counterclockwise polarized glasses while the other has strictly clockwise polarized glasses. This approach can also be further expanded to accommodate more than two views through other optics. Additional eye and head tracking can be added to update the displayed viewpoint and further improve the players' experience.

Figure 7:
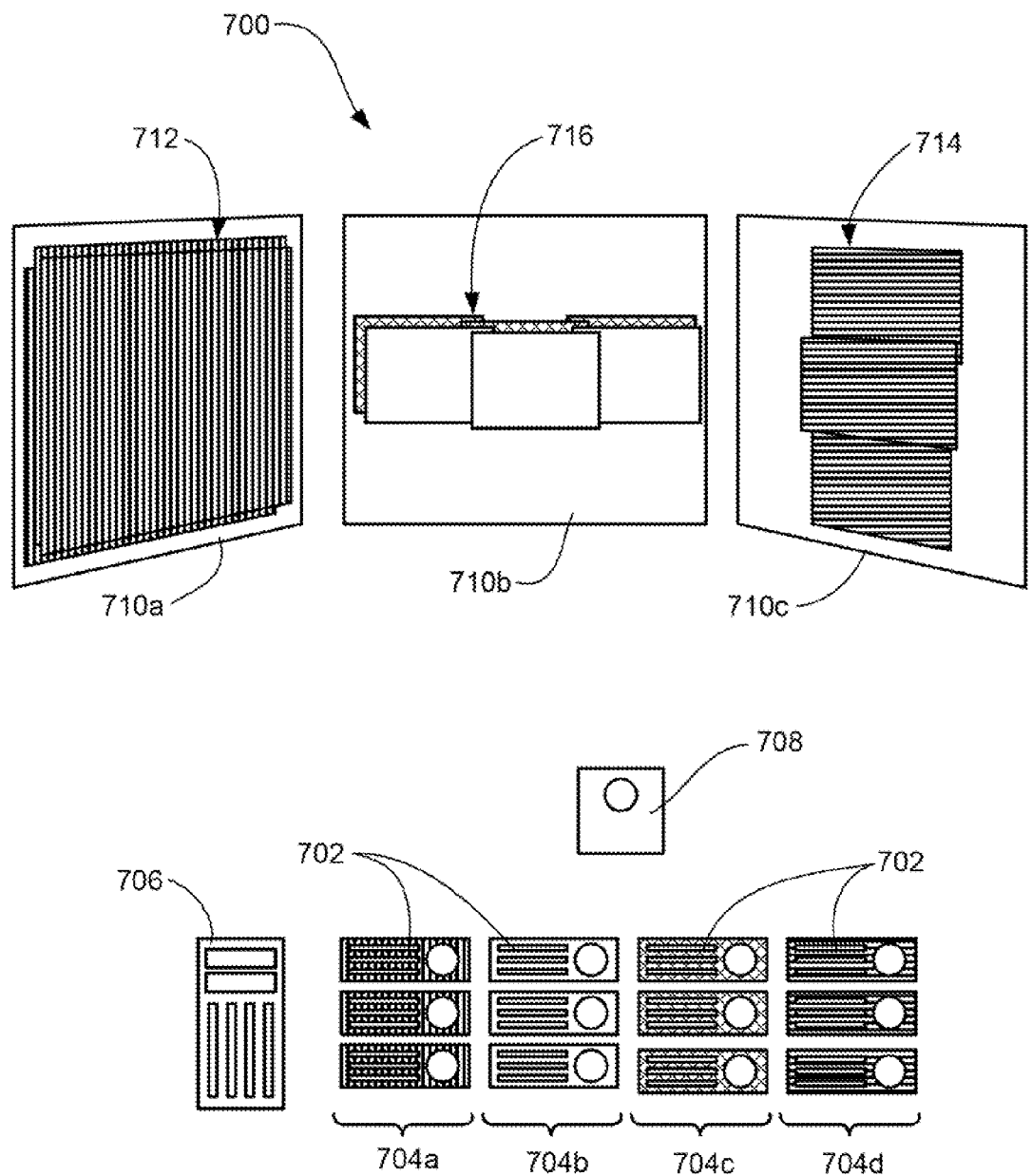
FIG. 7 is a diagram of an embodiment of a multi-projector system and display in which the projectors are divided into multiple sub-groups, to produce multiple composite images on separate screens.

Another embodiment of a multi-projector display system with projector sub-groups is shown in FIG. 7. In this embodiment, the system 700 includes twelve projectors 702 in four sub-groups 704a-d of three projectors each, with a controller 706 and calibration camera 708. The projectors are oriented toward three discrete screens 710a-c. These screens can be in close physical proximity, as shown, or they can be separated by some distance so that a viewer cannot see more than one screen at a time. The configuration of FIG. 7 demonstrates how each sub-group in a multi-projector system can have different design objectives or tradeoffs. For example, as shown in FIG. 7, the single control system can drive the first sub-group 704a to produce a fully superimposed image 712 on the first screen 710a, while the fourth sub-group 704d produces a maximally tiled image 714 on the third screen 710c. At the same time, the second and third sub-groups 704b, c can be associated with two channels of a stereoscopic 3D image, and both oriented to the second screen 710b to provide a 3D stereoscopic image 716. Other combinations can also be used, and the different configurations for the projected images on the different screens can be interchanged if desired.

It is also to be appreciated that multi-projector displays that are driven by a single control system can have display characteristics that are specifically selected for a given sub-group. For example, one display (produced via one sub-group) can be preselected to be twice as bright as the other displays, or to have a different color mix, and so forth. Thus, each sub-group can be optimized for a different display configuration (e.g. one superimposed, one tiled, one stereo 3D, etc), as shown in FIG. 7.

It is to be appreciated that the examples of multi-projector systems with projector sub-groups that are shown and described herein are merely illustrative. This type of system can extend to handle many different PC controller configurations, and can use many different configurations of screens, projectors, projector sub-groups, and calibration cameras. For example, while the various projection screens shown herein are planar, curved or otherwise non-planar screens can also be used.

The system disclosed herein thus enables multiple projectors to be used for multiple screens and/or multiple channel displays, including stereoscopic 3D applications. This system and method allows the consistent reproduction across multiple displays or multiple channels on the same display using centralized resources. This system has a number of desirable features. It automatically ensures that the multiple screens and/or multi-channel displays hit the target brightness and color, to ensure desired consistency. It maximizes the overall brightness for a full-color stereoscopic 3D display using multiple relatively low cost projectors. It ensures automatic alignment of the displays for a multi-channel stereoscopic 3D display. It creates tremendous flexibility, reconfigurability, and features for the display(s), such as automatic calibration, consistent brightness/color, arbitrary aspect ratio, good brightness and resolution, redundancy, and stereoscopic 3D. Using centralized resources, this system makes it easier to manage multiple screens and/or stereoscopic applications, such that content can easily flow across the screens. In the single PC controller case, it avoids having to deal with synchronization issues across multiple PC's to drive multiple screens and/or channels. This sort of system provides a relatively low cost, high quality system that can be desirable for visualization uses (e.g. oil and gas companies, automotive companies, etc.) as well as signage applications and the entertainment industry.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method for automatic delivery of consistent imagery in a multi-projector system, comprising the steps of:
    dividing the projectors into a plurality of sub-groups of projectors, each projector oriented to project a sub-frame to a sub-group display location, wherein the plurality of sub-groups comprises at least two sub-groups;
    adjusting the output of each projector in each separate sub-group to provide selected target display characteristics across all sub-groups; and
    projecting images from at least first and second sub-groups of projectors to a common display location to provide a display having multiple views.

2. The method in accordance with claim 1, wherein the step of adjusting the output of each projector sub-group comprises specifying target display characteristics and determining target parameters for each sub-group, and verifying the same via an image feedback camera.

3. The method in accordance with claim 1, further comprising the steps of:
    sending a first channel of stereoscopic 3D display data to a first sub-group of projectors;

sending a second channel of stereoscopic 3D display data to a second sub-group of projectors; and superimposedly projecting images from the first and second sub-groups to the common display location to provide a stereoscopic 3D display.

4. The method in accordance with claim 1, further comprising the steps of:

sending a first channel of display data to a first sub-group of projectors;

sending a second channel of display data to a second sub-group of projectors; and superimposedly projecting images from the first and second sub-groups to the common display location to provide a display having multiple views.

5. The method in accordance with claim 1, further comprising the step of causing display content to flow between sub-group display locations.

6. The method in accordance with claim 1, wherein the step of adjusting the output of each sub-group comprises adjusting at least one of brightness and chromaticity of the projectors in the sub-group.

7. The method in accordance with claim 1, wherein the sub-group display location is selected from the group consisting of multiple separate sub-group display locations, and a display location that is common for at least two sub-groups.

8. The method in accordance with claim 1, wherein each sub-group includes at least two projectors.

9. A computer program product comprising machine-readable instructions stored on a non-transitory computer-readable media for causing a computing device to perform the steps of:

dividing the projectors of a multi-projector system into a plurality of sub-groups of projectors, each projector oriented to project a sub-frame to a sub-group display location, wherein the plurality of sub-groups comprises at least two sub-groups;

adjusting the output of each separate projector sub-group to selected target parameters;

sending display data to each projector in each sub-group to project a composite image to each sub-group display location; and projecting images from at least first and second sub-groups of projectors to a common display location to provide a display having multiple views.

10. The computer program product in accordance with claim 9, wherein the step of adjusting the output of each projector sub-group comprises selecting rendering parameters for each projector in the sub-group and verifying the same via an image feedback camera, such that an overall target characteristic is achieved across all sub-groups.

11. The computer program in accordance with claim 9, wherein the step of sending display data to each projector in each sub-group comprises:

sending a first channel of stereoscopic 3D display data to a first sub-group of projectors;

sending a second channel of stereoscopic 3D display data to a second sub-group of projectors; and superimposedly projecting images from the first and second sub-groups to the common display location to provide a stereoscopic 3D display.

12. A projection system, comprising:

a plurality of sub-groups of projectors, each projector oriented to project a sub-frame to a sub-group display location, wherein the plurality of sub-groups comprises at least two sub-groups;

a camera, oriented to obtain an image of the sub-group display location; and a controller, coupled to the camera and all of the projectors, configured to select target parameters for each projector in each separate sub-group based upon feedback from the camera, and to independently provide digital values to each projector such that an overall target display characteristic is achieved across all sub-groups, wherein the controller is further configured to project images from at least first and second sub-groups of projectors to a common display location to provide a display having multiple views.

13. The projection system in accordance with claim 12, wherein the sub-group display location is selected from the group consisting of multiple separate sub-group display locations, and a display location that is common for at least two sub-groups.

14. The projection system in accordance with claim 13, wherein the separate sub-group display locations are positioned proximate to each other, and the controller is configured to cause display content to flow between sub-group displays.

15. The projection system in accordance with claim 12, wherein the sub-groups comprise at least two sub-groups, each sub-group being configured to project one of multiple views.

\* \* \* \* \*